United States Patent
Strubbe et al.

(10) Patent No.: US 6,850,265 B1
(45) Date of Patent: Feb. 1, 2005

(54) METHOD AND APPARATUS FOR TRACKING MOVING OBJECTS USING COMBINED VIDEO AND AUDIO INFORMATION IN VIDEO CONFERENCING AND OTHER APPLICATIONS

(75) Inventors: Hugo J. Strubbe, Yorktown Heights, NY (US); Mi-Suen Lee, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/548,734

(22) Filed: Apr. 13, 2000

(51) Int. Cl.[7] .............................................. H04N 7/14
(52) U.S. Cl. ............................ 348/14.05; 348/208.14; 348/211.9
(58) Field of Search ..................... 348/14.01–14.03, 348/14.05, 14.07–14.09, 14.16, 142–143, 169–170, 211.99, 211.1, 211.8–211.12, 208.14, 211.14

(56) References Cited

U.S. PATENT DOCUMENTS

| | | | |
|---|---|---|---|
| 5,355,165 A | | 10/1994 | Kosonocky et al. ........ 348/311 |
| 5,434,617 A | * | 7/1995 | Bianchi ...................... 348/170 |
| 5,652,619 A | | 7/1997 | Nakamura et al. .......... 348/211 |
| 5,812,193 A | | 9/1998 | Tomitaka et al. ........... 348/369 |
| 5,844,599 A | * | 12/1998 | Hildin ........................ 348/14.1 |
| 6,005,610 A | * | 12/1999 | Pingali ....................... 348/169 |
| 6,275,258 B1 | * | 8/2001 | Chim .................... 348/211.12 |
| 6,380,968 B1 | * | 4/2002 | Alexander et al. ....... 348/14.05 |
| 6,452,628 B2 | * | 9/2002 | Kato et al. .................. 348/143 |
| 6,593,956 B1 | * | 7/2003 | Potts et al. ............... 348/14.09 |

FOREIGN PATENT DOCUMENTS

| | | | |
|---|---|---|---|
| EP | 0689356 A2 | 12/1995 | ............ H04N/7/15 |
| EP | 0765084 | 3/1997 | ............ H04N/7/15 |
| GB | 2274958 | 8/1994 | ............ H04R/3/00 |
| JP | 09083856 A | * 3/1997 | .......... H04N/5/232 |
| WO | WO9406246 | 3/1994 | ............ H04N/7/14 |
| WO | WO9417636 | 8/1994 | ............ H04N/7/18 |

OTHER PUBLICATIONS

A.W. Davis, "Image Recognition and Video Conferencing: A New role for Vision in Interactive Media?", Advanced Imaging, pp. 30–32, Feb. 2000.

* cited by examiner

Primary Examiner—George Eng
(74) Attorney, Agent, or Firm—Gregory L. Thorne

(57) ABSTRACT

A video processing system tracks a moving person or other object of interest using a combined audio-video tracking system. The audio-video tracking system comprises an audio locator, a video locator, and a set of rules for determining the manner in which settings of a camera are adjusted based on outputs of the audio locator and video locator. The set of rules may be configured such that only the audio locator output is used to adjust the camera settings if the audio locator and video locator outputs are not sufficiently close and a confidence indicator generated by the audio locator is above a specified threshold. For example, in such a situation, the audio locator output alone may be used to direct the camera to a new speaker in a video conference. If the audio locator and video locator outputs are sufficiently close, the system determines if a confidence indicator generated by the video locator is above a specified level, and if so, the video locator output may be used to adjust the camera settings. For example, the camera may be zoomed in such that the face of a video conference participant is centered in and occupies a designated portion of a video frame generated by the camera.

23 Claims, 3 Drawing Sheets

METHOD AND APPARATUS FOR TRACKING MOVING OBJECTS USING COMBINED VIDEO AND AUDIO INFORMATION IN VIDEO CONFERENCING AND OTHER APPLICATIONS

FIELD OF THE INVENTION

The present invention relates generally to the fields of audio and image signal processing, and more particularly to techniques for tracking moving persons or other objects of interest in video conferencing and other applications.

BACKGROUND OF THE INVENTION

Detection and tracking of a person or other object of interest is an important aspect of video-camera-based systems such as video conferencing systems, video surveillance and monitoring systems, and human-machine interfaces. For example, in a video conferencing system, it is often desirable to frame the head and shoulders of a particular conference participant in the resultant output video signal.

A conventional boardroom-type video conferencing system will typically include a pan-tilt-zoom (PTZ) camera mounted on top of a monitor. The PTZ camera may be operated via an infrared remote control by one of the participants, that participant being designated as a de facto cameraman, or by a non-participant cameraman. The cameraman generally tries to control the pan, tilt and zoom settings of the camera so as keep the current speaker in view, and sufficiently in close-up, such that participants at the remote receiving end can see the speaker's facial expressions. When the speaker gets up, writes on a whiteboard, or points at an object, the cameraman has to follow the speaker's movements accordingly. In some cases, the cameraman may have to react to explicit commands issued by the speaker, such as "Zoom in more."

However, even for a human cameraman, it is not always easy to produce a satisfying video conference experience, as the conference is a live event without a script. The cameraman has to react to unexpected movements or commands by the speaker, and to interruptions and short utterances of other participants often outside his field of vision. The cameraman's reactions to the situation largely determine the quality of the video conference experience for the remote participants, i.e., determine whether the remote participants see the correct persons on their monitor, at the correct time and with the correct zoom, and determine whether the movement of the picture is distracting, disorienting or shows excessive artifacts.

The pattern of movement of the camera can also have an effect on the local participants. For example, the local participants might attribute a "personality" to the camera, such as dominant, nervous, attentive, etc.

These and other factors make it difficult for a human cameraman to provide the requisite tracking function in a video conferencing system.

A number of techniques are known in the art for providing automated tracking of speakers or other objects in a video conferencing system. For example, U.S. Pat. No. 6,005,610 issued Dec. 21, 1999 to S. Pingali describes an audio-visual object localization and tracking system in which audio and video information are combined to implement a tracking function. Another audio-video tracking system known in the art is the PictureTel SwiftSite-II set-top video conferencing system, as described in A. W. Davis, "Image Recognition and Video Conferencing: A New Role for Vision in Interactive Media?," Advanced Imaging, pp. 30–32, February 2000. A problem with these and other conventional techniques is that they generally fail to combine the audio and video information in a manner which avoids unnecessary or awkward camera movements to the greatest extent possible.

A need therefore exists for improved techniques for efficiently automating the tracking process in video conferencing and other applications, so as to free a participant or other human cameraman from this task, without degrading the quality of the resulting video conference.

SUMMARY OF THE INVENTION

The invention provides methods and apparatus for combined audio-video tracking of persons or other objects of interest in a video conferencing system or other application.

In accordance with an illustrative embodiment of the invention, a video processing system includes an audio-video tracking system for controlling the settings of a pan-tilt-zoom camera. The audio-video tracking system comprises an audio locator, a video locator, and a set of rules for determining the manner in which settings of a camera are adjusted based on tracking outputs of the audio locator and video locator.

In the illustrative embodiment, the set of rules may be configured such that only the audio locator output is used to adjust the camera settings if tracking outputs of the audio locator and video locator are not sufficiently in agreement as to the location of an object of interest in a current measurement interval. For example, in such a situation, the audio locator output alone may be used to direct the camera to a new speaker in a video conference. An additional check may be performed to ensure that a confidence indicator generated by the audio locator is above a specified threshold before using the audio locator tracking output to adjust the camera settings.

If the audio locator and video locator tracking outputs are sufficiently close, e.g., indicating a directionality measure within 5 degrees of one another, the system determines if a confidence indicator generated by the video locator is above a specified threshold. If the video locator confidence indicator is above the specified threshold, the video locator tracking output may be used to adjust the camera settings. For example, the camera may be zoomed in such that the face of a video conference participant is centered in and occupies a designated portion of a video frame generated by the camera.

The set of rules in accordance with the invention may also include rules for determining when not to track an object of interest based on the audio locator and video locator outputs. For example, the set of rules may specify that the camera is zoomed out by a predetermined amount, e.g., 20%, after a detected period of continued silence exceeds a first amount of time, and that the camera is zoomed out by an additional amount, e.g., to provide a group view of local video conference participants, if the detected period of continued silence exceeds a second amount of time greater than the first amount of time.

An audio-video tracking system in accordance with the present invention provides a number of advantages over conventional systems. For example, the system of the invention is substantially less likely than conventional systems to zoom in to irrelevant objects. It avoids the need for a local participant to control the camera manually, while also making the local participants more aware of the manner in which their actions control the direction of the camera. Participants using the system of the invention will quickly learn how to attract the attention of the camera, e.g., raising their voices, talking directly to the camera, or making small motions to encourage the camera to zoom. The invention allows an autonomously-moving camera to effectively become the moderator of the video conference.

The techniques of the invention can be used in a wide variety of video processing applications, including video-camera-based systems such as video conferencing systems, video surveillance and monitoring systems, etc.

These and other features and advantages of the present invention will become more apparent from the accompanying drawings and the following detailed description.

DETAILED DESCRIPTION OF THE INVENTION

Figure 1:
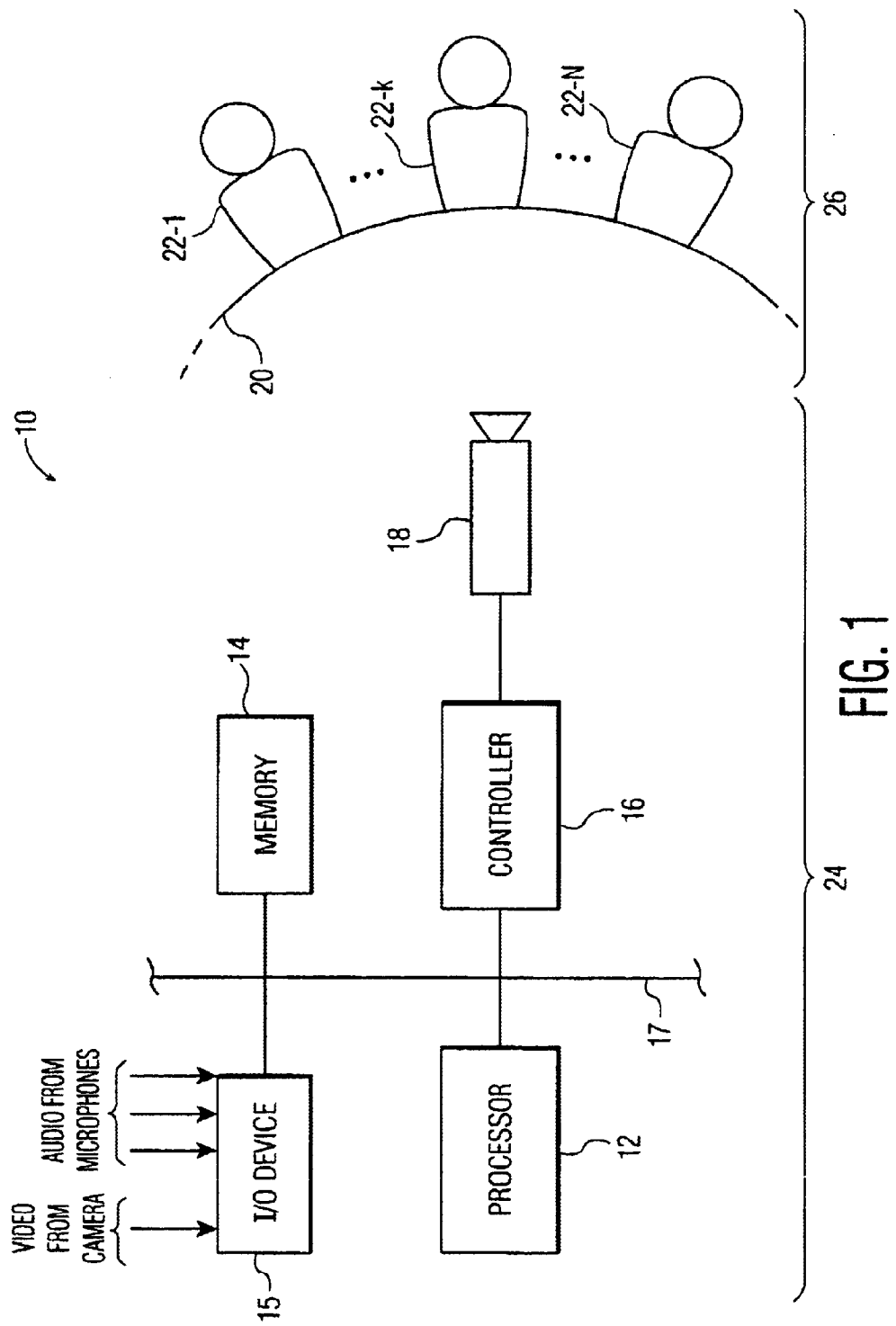
FIG. 1 is a block diagram of a video processing system in which the present invention may be implemented.

FIG. 1 shows a video processing system 10 in accordance with an illustrative embodiment of the invention. The system 10 includes a processor 12, a memory 14, an input/output (I/O) device 15 and a controller 16, all connected to communicate over a system bus 17. The system 10 further includes a pan-tilt-zoom (PTZ) camera 18 which is coupled to the controller 16 as shown.

In the illustrative embodiment, the PTZ camera 18 is employed in a video conferencing application in which a table 20 accommodates a number of conference participants 22-1, ..., 22-k, ..., 22-N. In operation, the PTZ camera 18, as directed by the controller 16 in accordance with instructions received from the processor 12, tracks an object of interest which in this example application corresponds to a particular participant 22-k. The PTZ performs this real-time tracking function using an audio-video tracking system to be described in greater detail below in conjunction with FIGS. 3 and 4.

As shown in FIG. 1, the I/O device 15 receives a video signal from the camera 18, as well as a number of audio signals, each from a corresponding microphone. The microphones may be part of or otherwise associated with the camera 18, e.g., in a manner to be described in conjunction with FIG. 2. Numerous other types and arrangements of connections may be used to supply video and audio signals from the camera 18 to processor 12 or other system elements for processing in accordance with the techniques of the present invention.

Although the invention will be illustrated in the context of a video conferencing application, it should be understood that the video processing system 10 can be used in a wide variety of other applications. For example, the portion 24 of the system 10 can be used in video surveillance applications, and in other types of video conferencing applications, e.g., in applications involving congress-like seating arrangements, circular or rectangular table arrangements, etc.

More generally, the portion 24 of system 10 can be used in any application that can benefit from the improved tracking function provided by a combined audio-video tracking system in accordance with the invention. The portion 26 of the system 10 may therefore be replaced with, e.g., other video conferencing arrangements, video surveillance arrangements, or any other arrangement of one or more objects of interest to be tracked using the portion 24 of the system 10.

It should be noted that the invention can be used with image capture devices other than PTZ cameras. The term "camera" as used herein is therefore intended to include any type of image capture device which can be used in conjunction with a combined audio-video tracking system.

It should also be noted that elements or groups of elements of the system 10 may represent corresponding elements of an otherwise conventional desktop or portable computer, as well as portions or combinations of these and other processing devices. Moreover, in other embodiments of the invention, some or all of the functions of the processor 12, controller 16 or other elements of the system 10 may be combined into a single device. For example, one or more of the elements of system 10 may be implemented as an application specific integrated circuit (ASIC) or circuit card to be incorporated into a computer, television, set-top box or other processing device.

The term "processor" as used herein is intended to include a microprocessor, central processing unit, microcontroller or any other data processing element that may be utilized in a given data processing device. The memory 14 may represent an electronic memory, an optical or magnetic disk-based memory, a tape-based memory, as well as combinations or portions of these and other types of storage devices.

The present invention in the illustrative embodiment provides techniques which utilize combinations of audio and video information to track moving persons or other objects of interest in video conferencing and other applications.

Figure 2:
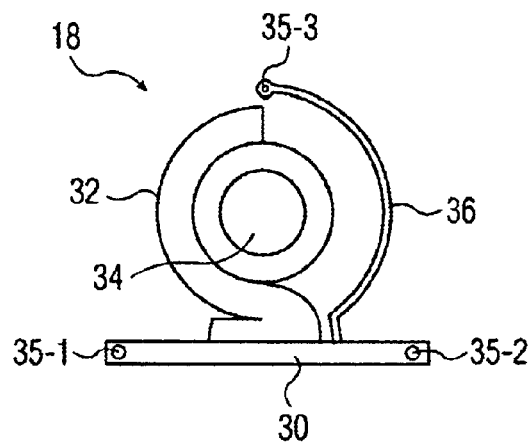
FIG. 2 shows an example of a camera that may be utilized in the video processing system of FIG. 1.

FIG. 2 shows a more detailed view of the camera 18 in the illustrative embodiment. The camera 18 includes a base 30 and an arm 32 which supports a movable imaging device 34. Incorporated into the base 30 are a pair of microphones 35-1 and 35-2. An additional microphone 35-3 is supported above the imaging device 34 by an arm 36. The microphones 35-1 and 35-2 are located approximately 12 centimeters apart, and the microphone 35-3 is located approximately 12 centimeters above the base 30. It should be emphasized that the particular number and arrangement of the microphones in the illustrative embodiment are by way of example only, and should not be construed as limiting the scope of the present invention in any way.

As previously indicated, a video signal from the camera 18 and audio signals from the microphones 35-1, 35-2 and 35-3 associated therewith may be supplied to processor 12 or other elements of system 10 via the I/O device 15.

Figure 3:
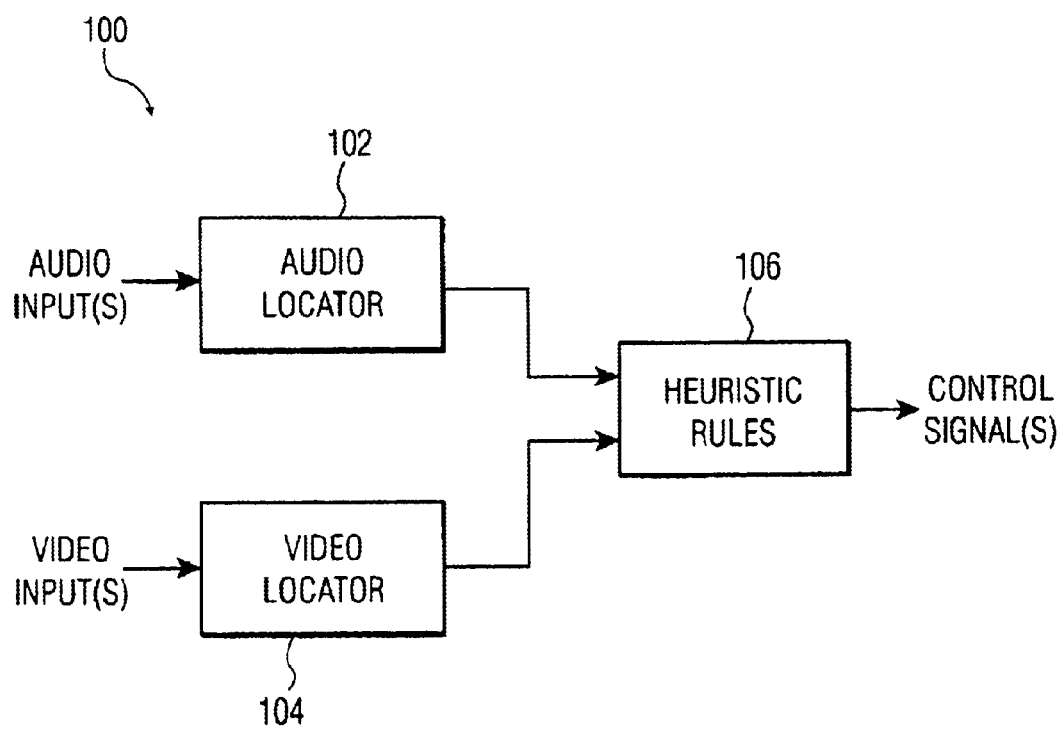
FIG. 3 is a functional block diagram of an audio-video tracking system in accordance with an illustrative embodiment of the invention.

FIG. 3 shows a functional block diagram of an audio-video tracking system 100 that may be implemented in the processing system 10 of FIG. 1 in the illustrative embodiment of the invention. The audio-video tracking system 100 includes an audio locator 102, a video locator 104, and a set of heuristic rules 106. The audio locator 102 receives one or more audio inputs from the camera 18, e.g., audio inputs from each of the microphones 35-1, 35-2 and 35-3 of camera 18. The video locator 104 receives one or more video inputs from the camera 18.

The audio locator 102 and video locator 104 provide audio tracking and video tracking functions, respectively. The audio locator 102 may be of a type described in U.S. patent application Ser. No. 09/436,193, filed Nov. 8, 1999 in the name of inventors Harm J. Belt and Cornelis P. Janse and entitled "Improved Signal Localization Arrangement," which is incorporated by reference herein. Such an audio locator can generate as a tracking output a direction indicator which can be used to discriminate between speakers, e.g., as a byproduct of echo cancellation. Other types of audio locators may also be used in implementing the present invention.

The video locator 104 may be any of a variety of well-known conventional systems capable of tracking persons or other objects of interest in a video signal or other type of image signal.

In accordance with the invention, the audio locator 102 and video locator 104 are each configured to generate a confidence indicator in each of a number of measurement intervals, the confidence indicators reflecting the confidence of the respective audio and video locators in detecting audio and video of a particular designated type. The confidence indicators and corresponding audio and video location measures are processed using the set of heuristic rules 106, so as to generate one or more control signals for controlling the pan, tilt and/or zoom settings of the camera 18.

The audio locator 102, video locator 104 and heuristic rules 106 may be implemented in software running on the processing system 10. For example, the system 10 may include an SGI Octane computer equipped with dual R10000 processors running one or more software elements of the audio-video tracking system 100. Of course, many other types of hardware platforms may be used to implement the audio-video tracking system 10 in accordance with the techniques of the present invention.

Figure 4:
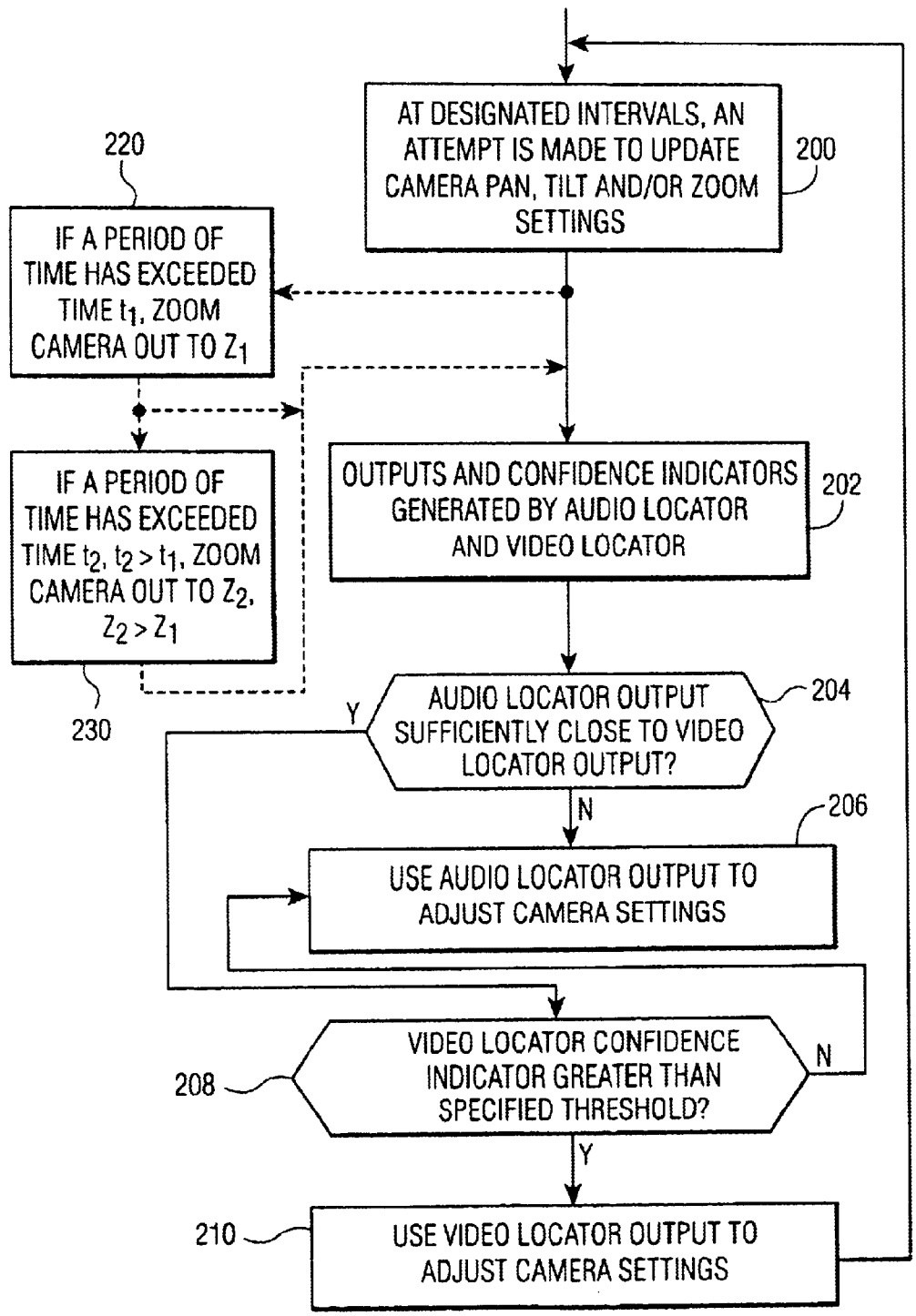
FIG. 4 is a flow diagram illustrating the operation of the audio-video tracking system of FIG. 3 in greater detail.

FIG. 4 is a flow diagram illustrating a generalized audio-video tracking process that may be carried out by the audio-video tracking system 100 of FIG. 3. It is assumed for this example that the audio tracking provided by the audio locator 102 and the video tracking provided by the video locator 104 always remain active during a given video conference.

Step 200 indicates that at designated measurement intervals, an attempt is made by the tracking system 100 to update the pan, tilt and/or zoom settings of the camera 18. The designated measurement intervals may be periodic, e.g., every 5 seconds. During a given measurement interval, both the audio locator 102 and the video locator 104 each generate a tracking output as well as a corresponding confidence indicator, as shown in step 202.

The tracking outputs from the audio locator 102 and video locator 104 may be in the form of, e.g., a directionality measure in degrees indicating a direction from a central axis of the camera 18 to a detected speaker. Other types of directionality measures or tracking outputs may also be used.

The confidence indicator generated by the audio locator 102 may indicate, e.g., how certain the audio locator 102 is to have "heard" a speaker, and may also include an indication of the location associated with that speaker. The confidence indicator generated by the video locator 104 may indicate, e.g., how certain the video locator 104 is to have "seen" a face, and may also include an indication as to the size of the face within the video input. Other types of confidence measures can also be used.

A determination is made in step 204 as to whether the audio locator tracking output is sufficiently close to the video locator tracking output. For example, step 204 may determine if directionality measures from audio locator 102 and video locator 104 are within a specified range of one another, e.g., within 5 degrees of one another. This indicates that the audio locator 102 and video locator 104 are sufficiently in agreement as to the location of the current speaker.

If step 204 indicates that the tracking outputs of the audio locator 102 and video locator 104 are not sufficiently close, the output of the audio locator 102 is used to adjust the camera settings, as indicated in step 206.

Step 206 may include an additional check performed prior to any adjustment in the camera setting, in order to determine if the confidence measure of the audio locator 102 is above a specified threshold. For example, if the confidence measure of the audio locator 102 is not above the specified threshold, indicating that speaker location cannot be determined with sufficient accuracy in the current measurement interval, step 206 may not make any adjustment to the camera settings, and the process will return to step 200 to await the next measurement interval.

In step 206, a high audio locator confidence level may result in a small position adjustment and possibly to further zooming out of the camera. More detailed examples of the manner in which the camera settings may be adjusted based on the audio locator output in accordance with the set of heuristic rules 106 will be described below.

If the tracking outputs of the audio locator 102 and video locator 104 are sufficiently close, the process in step 208 determines if the video locator confidence indicator is greater than a specified threshold.

The specified threshold in step 208 may, but need not, be the same as the above-noted audio locator confidence indicator threshold. If the video locator confidence interval is above the threshold, the output of the video locator 104 is used to adjust the camera settings, as indicated in step 210. For example, a high video locator confidence level may result in a small position adjustment and possibly to further zooming in of the camera. A more detailed example of the manner in which the camera settings may be adjusted based on the video locator output in accordance with the set of heuristic rules 106 will be described below. If the video locator confidence indicator is-not above the specified threshold, the process returns to step 206, such that the audio locator tracking output is used to adjust the camera settings, assuming the corresponding audio confidence indicator is above its specified threshold.

The steps 204 through 210 of the FIG. 4 flow diagram represent a simple example of a set of heuristic rules 106 that may be used in the audio-video tracking system of FIG. 3. A more detailed example of a set of heuristic rules 106 in accordance with the invention will be described below, along with specific examples of the manner in which the outputs of the audio locator 102 and video locator 104 may be used to generate one or more control signals for controlling the pan, tilt and zoom settings of the camera 18.

The set of rules 106 in the following example is designed to provide automated control of the camera 18 in a manner which preserves the desirable control functions generally provided by a skilled human cameramen.

The above-described illustrative embodiment of the audio-video tracking system 100 operating in conjunction with the camera 18 can generally determine the direction to the current speaker, provided it can eliminate false events, i.e., events which direct it toward unwanted objects. These false events may include, e.g., local stationary noise, such as that generated by air conditioning; local non-speech noise, such as from papers being shuffled; sound made by the motion of the camera itself; and sound made by the remote participants, coming through the system loudspeakers.

The audio locator 102 is also preferably of a type, such as that described in the above-cited U.S. patent application Ser. No. 09/436,193, which is able to locate the loudest person if several people speak at the same time.

The heuristic rules 106 of the audio-video tracking system 100 in the present example are configured to discriminate between "same speaker" and "new speaker." When the audio locator output indicates that sustained speech is coming from the same direction for a designated minimum time period of duration t, which may be on the order of 5 seconds, the system 100 assumes that the same speaker is still active. When sustained speech comes from a new direction during the t second time period, the system assumes that a new speaker has started speaking. These rules prevent a participant who utters non-intentional speech (e.g., "aha" to agree with the speaker) or short intentional speech (e.g., an interruption, such as "are you sure?") from being considered a new speaker. Reactions to such short utterances would generally lead to frantic camera movements, and the heuristic rules 106 are thus designed to avoid such movements.

When a new speaker is detected, the audio-video tracking system 100 generates a control signal directing the camera 18 to zoom out by 20% and to turn immediately to the direction of the new speaker at full speed. The video is not switched off during the motion, such that the resulting video output is in the form of a pan.

Detection of the same speaker, at most every t seconds, can trigger a video-based action as follows. The video locator 104 continuously tries to find a face in the incoming video stream, using well-known conventional techniques based on features such as motion and face color. As most people move their heads considerably while talking, the system 100 assumes that the person in view who is moving is the speaker. If the video locator 104 has built up enough confidence during the last t seconds to know where the face is, the system 100 will generate a control signal directing the camera 18 to slowly pan so as to put the chin of the face near the middle of the picture. It will then zoom in until the head has a predefined size, such as, e.g., 35% of the screen height. To avoid visual distraction, the system 100 may be configured such that zoom adjustments occur only every t seconds and are never bigger than about 20%.

The set of heuristic rules 106 in the present example also includes equally important rules for when not to track. For example, a sustained close-up of a participant who is listening is generally very uncomfortable for that participant. Therefore, the rules 106 may include a rule to the effect that all tracking stops when no one speaks locally or when a participant at the remote end speaks, and these two conditions may be considered equivalent. More specifically, the system 100 may, e.g., first generate a control signal directing the camera 18 to zoom out 20% after t seconds of silence, and then generate a control signal directing the camera 18 to zoom out fully to provide a group view after 30 seconds of silence. These optional steps are illustrated in FIG. 4, respectively as steps 220, 230. More complex rules may be used that involve intermediary steps when changing speaker or attempt to keep two often-alternating speakers in view.

It should be noted that a typical audio locator suitable for use in the system 100 may have an error of around 5 degrees, and may also be susceptible to sound reflections, e.g., small head movements may lead to quite different audio directions. The video locator output may also have large variations depending on how well the motion silhouette of the speaker was determined. Therefore, in order to prevent the video locator 104 from locking onto the wrong person (e.g., an agitated participant near to a still speaker), the system 100 may be configured to compare constantly the audio locator output with the video locator output. If their directions become too divergent, the system 100 generates a control signal directing the camera 18 to zoom out, and then restarts the tracking operation based on the audio direction.

The audio-video tracking system of the present invention provides a number of advantages over conventional systems. For example, in contrast to audio-only trackers, the system of the invention is substantially less likely to zoom in to irrelevant objects. It avoids the need for a local participant to control the camera manually, and makes the local participants more aware of the manner in which their actions control the direction of the camera. More particularly, participants using the system of the invention will quickly learn how to attract the attention of the camera, e.g., raising their voices, talking directly to the camera ("Come to me, camera"), or making small motions to encourage the camera to zoom. The autonomously-moving camera effectively becomes the moderator of the video conference, i.e., it decides who is in the picture and who is not.

The above-described embodiments of the invention are intended to be illustrative only. For example, the invention can be used to implement real-time detection and tracking of any desired object of interest, and in a wide variety of applications, including video conferencing systems, video surveillance systems, and other camera-based systems. As previously noted, the invention can also be implemented at least in part in the form of one or more software programs which are stored on an electronic, magnetic or optical storage medium and executed by a processing device or set of processing devices, e.g., by the processor 12 of system 10. These and numerous other embodiments within the scope of the following claims will be apparent to those skilled in the art.

What is claimed is:

1. A method for tracking an object of interest in a video processing system, the method comprising the steps of:

generating for particular ones of successive plural measurement intervals an audio locator output from an audio input derived from detecting sound from an object, and a video locator output from a video input derived partly from a camera detecting movement of an object, each indicative of a location of the object of interest;

applying a set of confidence level rules to each of the audio locator output and video locator output to determine which one of the audio locator output and the video locator output has a higher confidence level, whereby the one having the highest confidence level will be utilized independently from the other to adjust a setting of the camera during each one of said successive plural measurement intervals, but if in a measurement interval the confidence levels are equivalent, the video locator output is used if above an established threshold, otherwise the audio locator output is utilized; and adjusting the camera setting utilizing only the selected one of the audio locator output and the video locator output in accordance with the applied set of confidence level rules.

2. The method of claim 1 wherein the object of interest comprises a moving person.

3. The method of claim 1 wherein the camera is a pan-tilt-zoom (PTZ) camera having adjustable pan, tilt and zoom settings.

4. The method of claim 1 wherein the set of rules includes determining if the audio locator and video locator outputs are sufficiently close for the given measurement interval, and utilizing only the audio locator output to adjust the camera setting if the audio and video locator outputs are not within a specified range of one another for the given measurement interval.

5. The method of claim 4 wherein the set of rules further includes utilizing the video locator output to adjust the camera setting only if the audio and video locator outputs are within a specified range of one another for the given measurement interval.

6. The method of claim 1 wherein the set of rules includes determining based on the audio locator output if the object of interest corresponds to a new speaker in a multiple-participant system, and if a new speaker is detected, directing the camera to zoom out by a predetermined amount and to turn in a direction of the new speaker.

7. The method of claim 1 wherein the set of rules includes determining based on the audio locator output if the object of interest corresponds to a same speaker in a multiple-participant system, and if the same speaker is detected, utilizing the video locator output to adjust the camera setting so as place the same speaker at a designated position within one or more video frames generated by the camera.

8. The method of claim 7 wherein the set of rules further includes adjusting a zoom setting of the camera until a head of the identified same speaker occupies a designated portion of a given one of the one or more video frames generated by the camera.

9. The method of claim 1 wherein the set of rules specifies that the camera is zoomed out by a predetermined amount after a detected period of continued silence exceeds a first amount of time.

10. The method of claim 9 wherein the set of rules further specifies that the camera is zoomed out by an additional amount if the detected period of continued silence exceeds a second amount of time greater than the first amount of time.

11. The method of claim 1 wherein the set of rules further includes determining if a confidence indicator associated with the video locator output is above a specified video locator threshold for the given measurement interval, and utilizing the video locator output to adjust the camera setting only if the video locator confidence indicator is above the video locator threshold for the given measurement interval.

12. An apparatus for tracking an object of interest in a video processing system, the apparatus comprising:
a camera; and
a processor coupled to the camera and operative (i) to process an audio locator output from an audio input signal, and a video locator output from a video input signal derived partly from movement of the object, each indicative of a location of the object of interest for particular ones of given measurement intervals of a plurality of successive measurement intervals; and (ii) to apply a set of confidence level rules to each of the audio locator output and the video locator output to determine which one of the audio locator output and the video locator output has a higher confidence level, whereby the one having the highest confidence level will be utilized independently of the other to adjust a setting of the camera based on the given measurement interval.

13. The apparatus of claim 12 wherein the object of interest comprises a moving person.

14. The apparatus of claim 12 wherein the camera is a pan-tilt-zoom (PTZ) camera having adjustable pan, tilt and zoom settings.

15. The apparatus of claim 12 wherein the set of rules includes determining if the audio locator and video locator outputs are sufficiently close for the given measurement interval, and utilizing only the audio locator output to adjust the camera setting if the audio and video locator outputs are not within a specified range of one another for the given measurement interval.

16. The apparatus of claim 15 wherein the set of rules further includes utilizing the video locator output to adjust the camera setting only if the audio and video locator outputs are within a specified range of one another for the given measurement interval.

17. The apparatus of claim 12 wherein the set of rules includes determining based on the audio locator output if the object of interest corresponds to a new speaker in a multiple-participant system, and if a new speaker is detected, directing the camera to zoom out by a predetermined amount and to turn in a direction of the new speaker.

18. The apparatus of claim 12 wherein the set of rules includes determining based on the audio locator output if the object of interest corresponds to a same speaker in a multiple-participant system, and if the same speaker is detected, utilizing the video locator output to adjust the camera setting so as place the same speaker at a designated position within one or more video frames generated by the camera.

19. The apparatus of claim 18 wherein the set of rules further includes adjusting a zoom setting of the camera until a head of the identified same speaker occupies a designated portion of a given one of the one or more video frames.

20. The apparatus of claim 12 wherein the set of rules specifies that the camera is zoomed out by a predetermined amount after a detected period of continued silence exceeds a first amount of time.

21. The apparatus of claim 20 wherein the set of rules further specifies that the camera is zoomed out by an additional amount if the detected period of continued silence exceeds a second amount of time greater than the first amount of time.

22. The apparatus of claim 12 wherein the set of rules further includes determining if a confidence indicator associated with the video locator output is above a specified video locator threshold for the given measurement interval, and utilizing the video locator output to adjust the camera setting only if the video locator confidence indicator is above the video locator threshold for the given measurement interval.

23. An article of manufacture comprising a storage medium for storing one or more programs for tracking an object of interest in a video processing system, wherein the one or more programs when executed by a processor implement the steps of:
generating for particular ones of given measurement intervals of a plurality of successive measurement intervals, an audio locator output from an audio input, and a video locator output from a video input derived partly from detection of movement of the object, each indicative of a location of the object of interest;
applying a set of confidence level rules to each of the audio locator output and the video locator output to determine which one of the audio locator output and the video locator output has a higher confidence level, whereby the one having the highest confidence level will be utilized independently of the other to adjust a setting of the camera based on the given measurement interval; and
adjusting the camera setting utilizing only the selected one of the audio locator output and the video locator output in accordance with the applied set of confidence level rules.

* * * * *